US012211435B2

(12) United States Patent
Chang et al.

(10) Patent No.: US 12,211,435 B2
(45) Date of Patent: Jan. 28, 2025

(54) DISPLAY PANEL TRANSISTOR GATE-SIGNAL COMPENSATION SYSTEMS AND METHODS

(71) Applicant: Apple Inc., Cupertino, CA (US)

(72) Inventors: Sun-Il Chang, San Jose, CA (US); Kwang Soon Park, San Ramon, CA (US); Hao-Lin Chiu, Los Gatos, CA (US); Jie Won Ryu, San Jose, CA (US); Hyunsoo Kim, San Diego, CA (US); Hyunwoo Nho, Palo Alto, CA (US); Wei Xiong, Mountain View, CA (US); Patrick R Cruce, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/470,216

(22) Filed: Sep. 19, 2023

(65) Prior Publication Data

US 2024/0169903 A1 May 23, 2024

Related U.S. Application Data

(60) Provisional application No. 63/426,676, filed on Nov. 18, 2022.

(51) Int. Cl.

*G09G 5/10* (2006.01)
*G01R 31/28* (2006.01)
*G09G 3/3208* (2016.01)

(52) U.S. Cl.

CPC ... *G09G 3/3208* (2013.01); *G09G 2300/0408* (2013.01); *G09G 2300/0413* (2013.01); *G09G 2310/0289* (2013.01); *G09G 2320/045* (2013.01)

(58) Field of Classification Search

CPC ................ G09G 2320/043
See application file for complete search history.

(56) References Cited

U.S. PATENT DOCUMENTS

| | | | |
|---|---|---|---|
| 7,321,348 | B2 | 1/2008 | Cok et al. |
| 9,779,665 | B2 | 10/2017 | Song et al. |
| 9,886,891 | B2 | 2/2018 | In et al. |
| 10,140,920 | B2 | 11/2018 | Gai et al. |
| 10,410,584 | B2 | 9/2019 | Xie |
| 10,643,546 | B2 | 5/2020 | Lee et al. |

(Continued)

FOREIGN PATENT DOCUMENTS

| | | | |
|---|---|---|---|
| KR | 102379188 | B1 | 3/2017 |
| KR | 20180062099 | A | 6/2018 |
| KR | 20230062015 | A | 5/2023 |

*Primary Examiner* — Nan-Ying Yang
(74) *Attorney, Agent, or Firm* — Fletcher Yoder P.C.

(57) ABSTRACT

An electronic device may include an electronic display having a gate-on-array (GOA) that generates gate signals in response to an activation signal, pixels that activate in response to a combination of the gate signals and data signals indicative of image data, and sensing circuitry. The sensing circuitry may measure a characteristic response of a gate signal a characteristic response of one or more pixels, or both and compare the characteristic responses to baselines. The electronic device may also include compensation circuitry that applies a compensation to the activation signal and/or to the image data based on the comparisons between the characteristic responses and the baselines.

22 Claims, 13 Drawing Sheets

(56) References Cited

U.S. PATENT DOCUMENTS

| | | | | |
|---|---|---|---|---|
| 11,056,053 | B2 | 7/2021 | Lee et al. | |
| 11,238,793 | B2 | 2/2022 | Meng et al. | |
| 2011/0130981 | A1 * | 6/2011 | Chaji | G01R 31/44<br>702/58 |
| 2013/0328852 | A1 | 12/2013 | Jamal et al. | |
| 2017/0084229 | A1 | 3/2017 | Hirai et al. | |
| 2023/0197011 | A1 | 6/2023 | Hong et al. | |

* cited by examiner

DISPLAY PANEL TRANSISTOR GATE-SIGNAL COMPENSATION SYSTEMS AND METHODS

CROSS-REFERENCE TO RELATED APPLICATIONS

This application claims priority to and the benefit of U.S. Provisional Application No. 63/426,676, entitled "Display Panel Transistor Gate-Signal Compensation Systems and Methods," filed Nov. 18, 2022, which is hereby incorporated by reference in its entirety for all purposes.

SUMMARY

The present disclosure generally relates to sensing gate signals on an electronic display to enable compensation for changes in gate signal behavior over time.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To display an image, the display pixels of the display panel may be driven with different current/voltage levels according to the display image data. In general, the electronic display includes an array of thin-film transistors (TFTs) (e.g., oxide TFTs), also known as a gate-on-array (GOA), that buffer activation signals to regulate the voltage and/or current supplied to the display pixels. Such driving circuitry may also include a timing controller (TCON) to control activations of the GOA that aids in supplying the data signals (e.g., dataline voltages or currents) to the display pixels. The buffered GOA activation signals (e.g., gate signals) may be combined (e.g., via a convolution) with the data signals corresponding to the display image data to drive the display pixels.

In general, the gate signals of the GOA are set such that the "on" time is aligned with the data signals for transmission to the display pixels. In other words, the rising and falling edges of the GOA outputs are set to be time-aligned with the data signals to provide the desired amount of voltage and/or current to the display pixels. However, as the GOA ages (e.g., due to utilization, environmental effects, and over time) the characteristic response of the TFTs (e.g., rising and falling edges) to the same GOA input activation signal may change. For example, given the same GOA input signal, the effective on time (e.g., time between rising and falling edges at a threshold activation level) of an aged TFT may be reduced and/or shifted in time when compared to that of a less aged TFT. Such a reduction or shift in the effective on time may result in a different amount of voltage/current than intended being supplied to a display pixel, which may lead to image artifacts such as variations in luminance or color output of the display pixel.

In some embodiments, the effect of aging on the GOA may be measured by sensing the gate signal (e.g., gate signal voltage) output from the GOA and determining a change in the gate signal over the life of electronic device. Moreover, the gate signal may be measured at the output of the GOA for any row of display pixels or for a row of dummy pixels separate from the active area display pixels. Additionally or alternatively, the current utilization of the display pixels or dummy pixels may be sensed, and changes in the sensed current over the life of the GOA may be indicative of aging.

Furthermore, to compensate for GOA aging, the voltage and/or relative phase of the GOA activation signal may be altered based on an estimated amount of aging (e.g., based on the sensed gate signal voltage or pixel current). For example, the voltage levels of the GOA activation signal (e.g., from the level shifter) may be increased (and/or the reference voltage decreased) to adjust the on time of the TFT buffers and counter the effects of GOA aging. Additionally or alternatively, the phase (e.g., timing) of the GOA activation signal relative to the data signals may be altered. For example, the GOA activation signal may be sped up and/or the data signal may be delayed such that a shift in the on time due to aging is countered by the phase change. Additionally or alternatively to altering the voltage and/or relative phase of the GOA activation signal, the data signal may be altered (e.g., during image processing) to counter the optical effects (e.g., luminance or color shifts) of the changes in the dataline voltage/current applied to the display pixels.

BRIEF DESCRIPTION OF THE DRAWINGS

Various aspects of this disclosure may be better understood upon reading the following detailed description and upon reference to the drawings described below.

DETAILED DESCRIPTION

Figure 1:
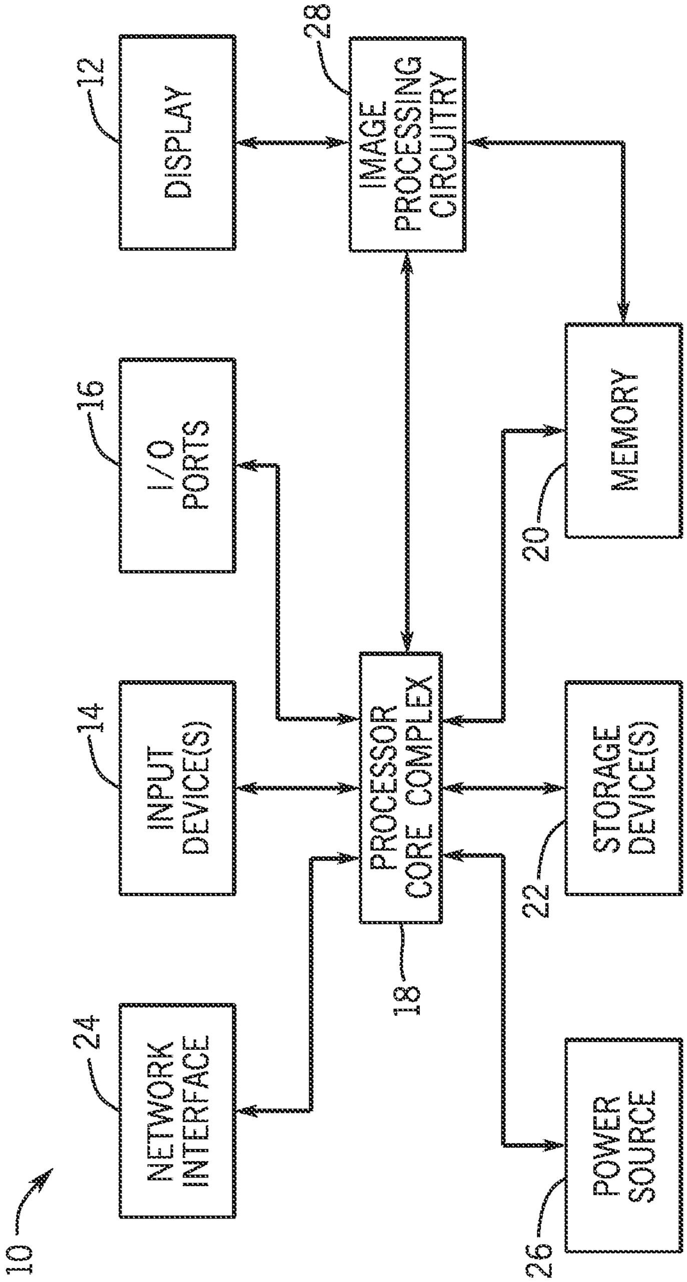
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution.

In some embodiments, the display pixels may include self-emissive pixels such as light emitting diodes (LEDs), organic LEDs (OLEDs), etc. or utilize transmissivity regulating elements such as liquid crystal pixels. In general, self-emissive pixels generate light indicative of a target luminance level according to the image data associated with the corresponding pixel. Additionally or alternatively, transmissive displays (e.g., liquid crystal displays (LCDs) utilize one or more backlights to generate light and regulate the amount and/or color of the generated light via transmissivity regulating elements according to the image data.

An image data source may provide the image data as a stream of pixel data, in which data for each pixel indicates a target luminance (e.g., brightness and/or color) of one or more display pixels located at corresponding pixel positions. In some embodiments, image data may indicate target luminance per color component, for example, via red component image data, blue component image data, and green component image data, collectively referred to as RGB image data (e.g., RGB, SRGB). Additionally or alternatively, image data may be indicated by a luma channel and one or more chrominance channels (e.g., YCbCr, YUV, etc.), grayscale, or other color basis. It should be appreciated that a luma channel, as disclosed herein, may encompass linear, non-linear, and/or gamma-corrected luminance values and may be of any suitable bit-depth. Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer. Moreover, the image data may be altered to enhance perceived contrast, sharpness, resolution, etc. After processing, display image data may be sent to a display panel for display.

To display an image, the display pixels of the display panel may be driven with different current/voltage levels according to the display image data. In general, the electronic display includes an array of thin-film transistors (TFTs) (e.g., oxide TFTs) that buffer activation signals to regulate the voltage and/or current supplied to the display pixels. Such driving circuitry may also include a timing controller (TCON) to control activations of the TFTs that aid in supplying the data signals (e.g., dataline voltages or currents) to the display pixels. In some embodiments, the TCON may utilize a level shifter to provide activation signals to the array of TFTs, also known as a gate-on-array (GOA). The buffered GOA activation signals (e.g., gate signals) may be combined (e.g., via a convolution) with the data signals corresponding to the display image data to drive the display pixels.

In general, the buffered GOA activation signals (e.g., gate signals) are set such that the "on" time is aligned with the data signals for transmission to the display pixels. In other words, the rising and falling edges of the GOA outputs are set to be time aligned with the data signals to provide the desired amount of voltage and/or current to the display pixels. However, as the GOA ages (e.g., due to utilization, environmental effects, and over time) the characteristic response of the TFTs (e.g., rising and falling edges) to the same GOA input activation signal may change. For example, given the same GOA input signal, the effective on time (e.g., time between rising and falling edges at a threshold activation level) of an aged TFT may be reduced and/or shifted in time when compared to that of a less aged TFT. Such a reduction or shift in the effective on time may result in a different amount of voltage/current than intended being supplied to a display pixel, which may lead to image artifacts such as variations in luminance or color output of the display pixel. Moreover, operating with tighter timing requirements, such as at higher frequency (e.g., refresh rate) or longer vertical blanking, may exacerbate such issues. Additionally, some display pixels, such as OLED display pixels, may be more sensitive to changes in the dataline voltage/current and, thus, may be more likely to exhibit image artifacts due to GOA aging.

In some embodiments, the effect of aging on the GOA may be measured by sensing the gate signal (e.g., gate signal voltage) output from the GOA and determining a change in the gate signal over time. Moreover, the gate signal may be measured at the output of the GOA for any row of display pixels or for a row of dummy pixels separate from the active area display pixels. Additionally or alternatively, the current utilization of the display pixels or dummy pixels may be sensed, and changes in the sensed current over the life of the GOA may be indicative of aging.

Furthermore, to compensate for GOA aging, the voltage and/or relative phase of the GOA activation signal may be altered based on an estimated amount of aging (e.g., based on the sensed gate signal voltage or pixel current). For example, the voltage levels of the GOA activation signal (e.g., from the level shifter) may be increased (and/or the reference voltage decreased) to adjust the on time of the TFT buffers and counter the effects of GOA aging. Additionally or alternatively, the phase (e.g., timing) of the GOA activation signal relative to the data signals may be altered. For example, the GOA activation signal may be sped up and/or the data signal may be delayed such that a shift in the on time due to aging is countered by the phase change. Additionally or alternatively to altering the voltage and/or relative phase of the GOA activation signal, the data signal may be altered (e.g., during image processing) to counter the optical effects (e.g., luminance or color shifts) of the changes in the dataline voltage/current applied to the display pixels.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
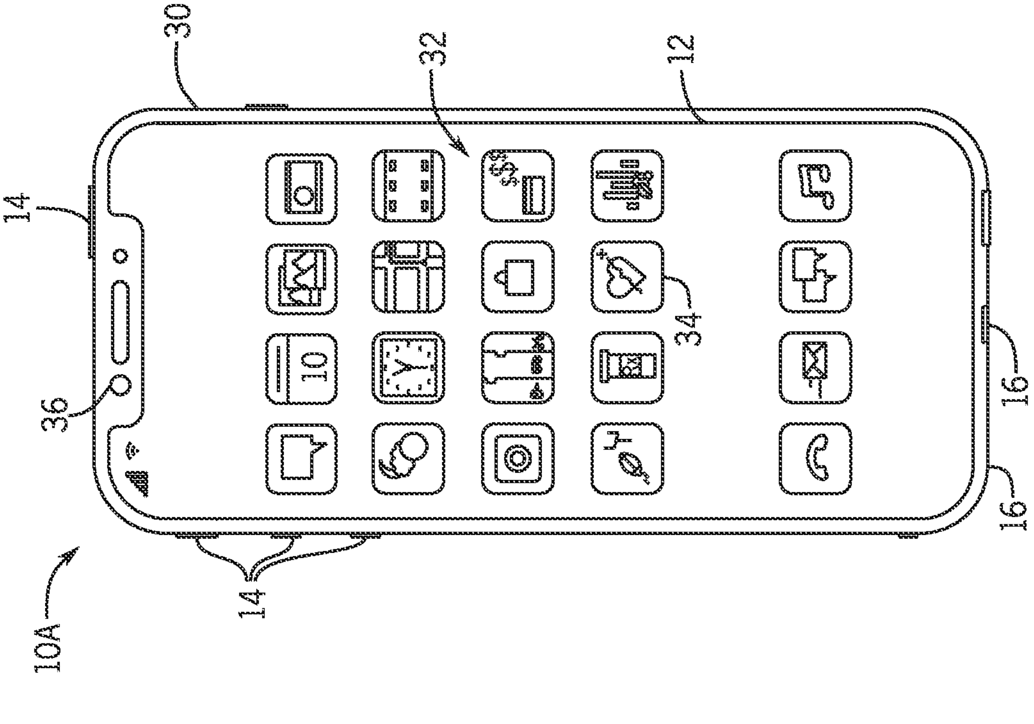
FIG. 2 is a front view of a mobile phone representing an example of the electronic device of FIG. 1, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
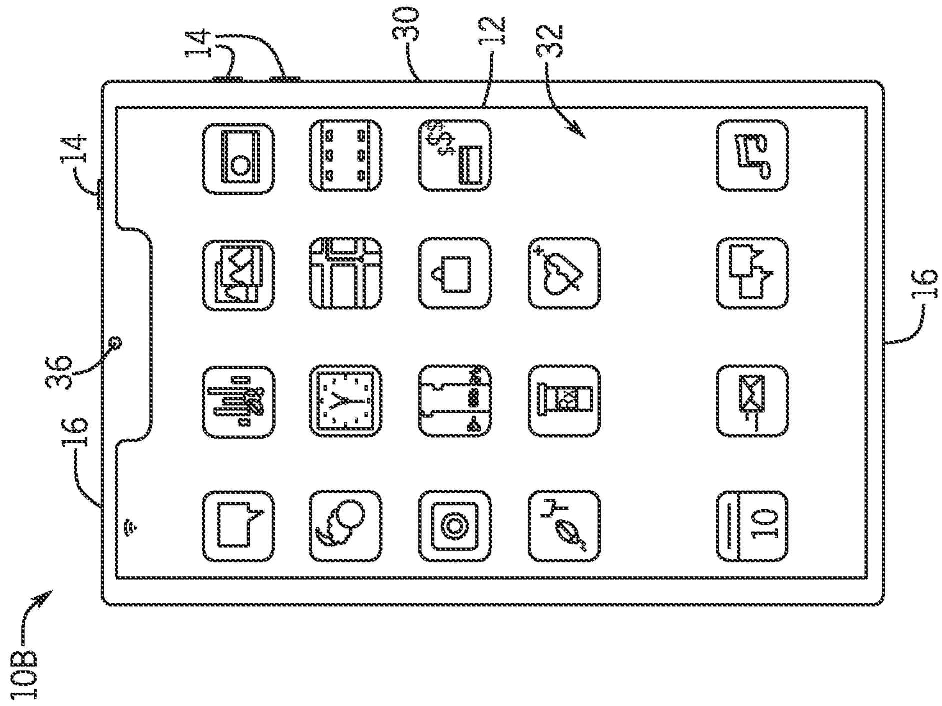
FIG. 3 is a front view of a tablet device representing an example of the electronic device of FIG. 1, in accordance with an embodiment.
Figure 4:
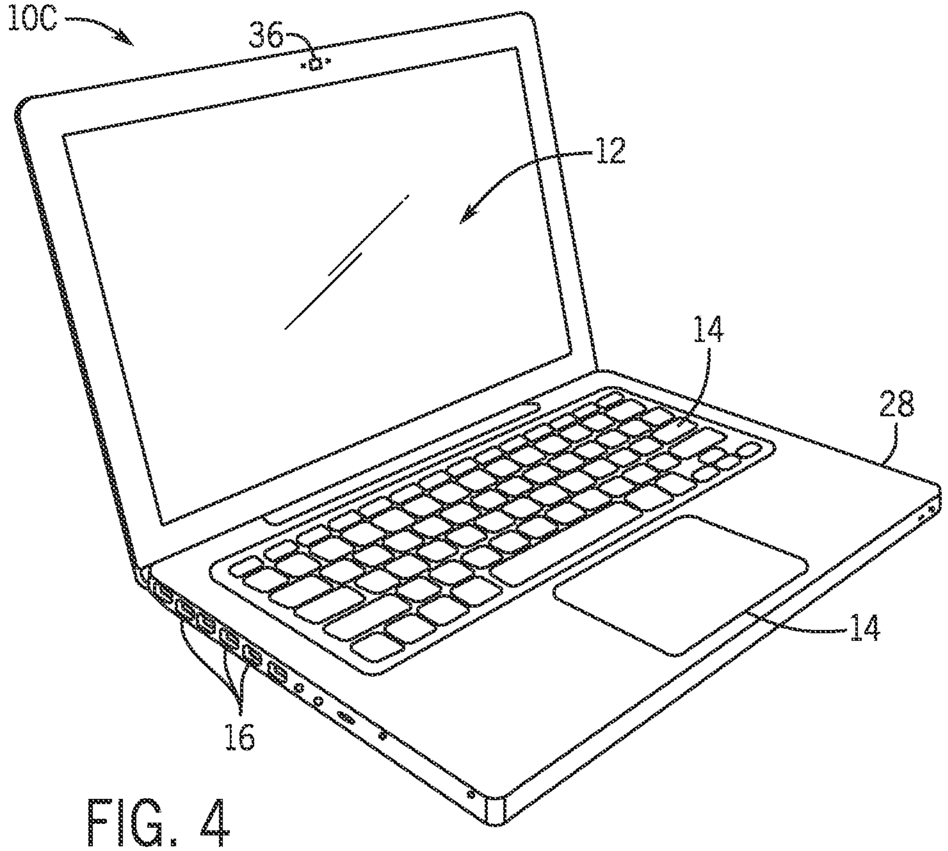
FIG. 4 is a front view of a notebook computer representing an example of the electronic device of FIG. 1, in accordance with an embodiment.
Figure 5:
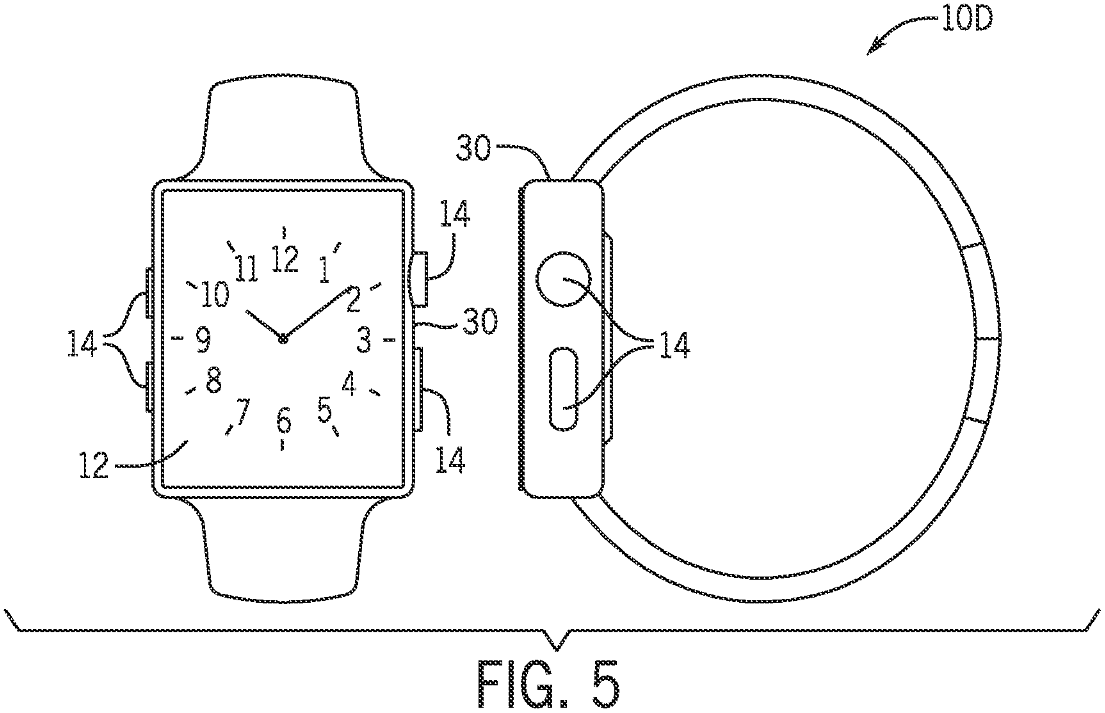
FIG. 5 is a front and side view of a watch representing an example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
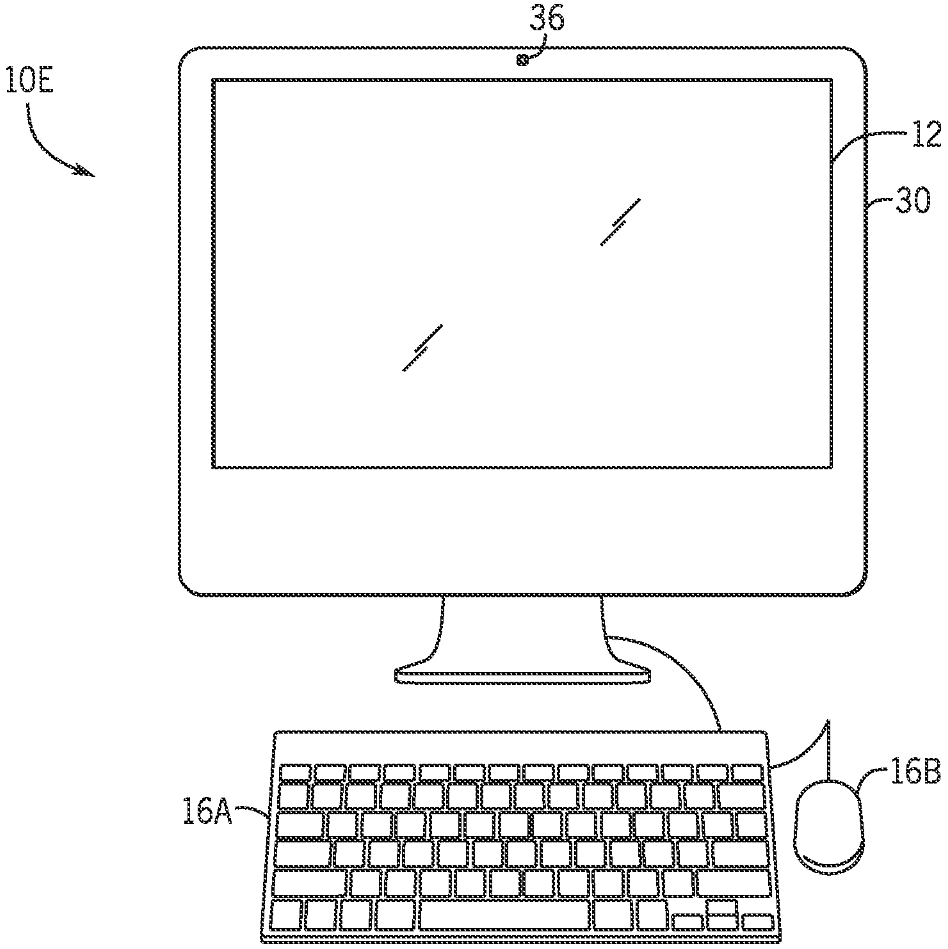
FIG. 6 is a front view of a computer representing an example of the electronic device of FIG. 1, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
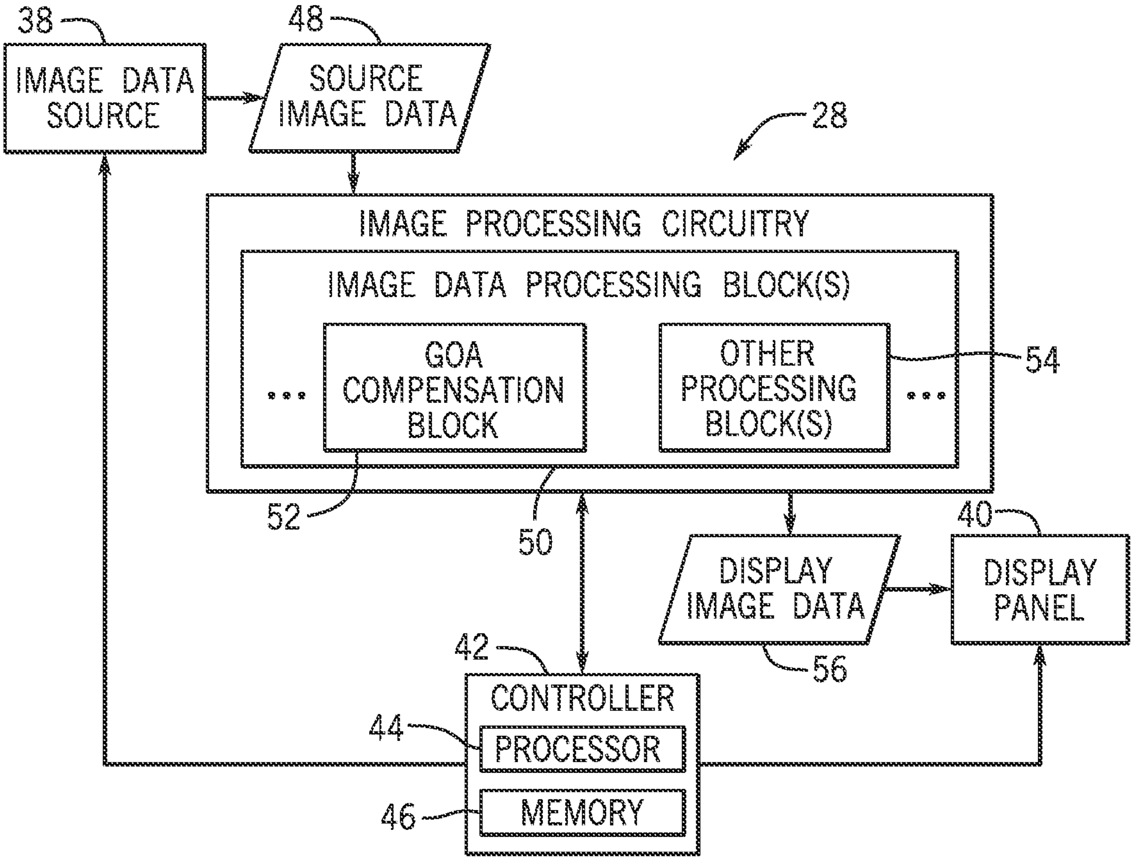
FIG. 7 is a block diagram of a portion of the image processing circuitry of FIG. 1 including a gate-on-array (GOA) compensation block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include general purpose and/or dedicated hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more sets of image data processing blocks 50 (e.g., circuitry, modules, or processing stages) such as a gate-on-array (GOA) compensation block 52. As should be appreciated, multiple other processing blocks 54 may also be incorporated into the image processing circuitry 28, such as a color management block, a pixel contrast control (PCC) block, a burn-in compensation (BIC) block, a scaling/rotation block, etc. before and/or after the GOA compensation block 52. The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

As described herein, the GOA compensation block 52 may adjust image data (e.g., by color component and/or grey level), for example, to facilitate compensating for GOA aging related effects. For example, the image data may be compensated to counter the optical effects (e.g., luminance or color shifts) of the changes in the dataline voltage/current applied to the display pixels due to aging of the GOA. As discussed below, the GOA compensation block 52 of the image processing circuitry is one of multiple potential compensations for GOA aging. As such, the GOA compensation block 52 may or may not be implemented, depending on implementation.

Figure 8:
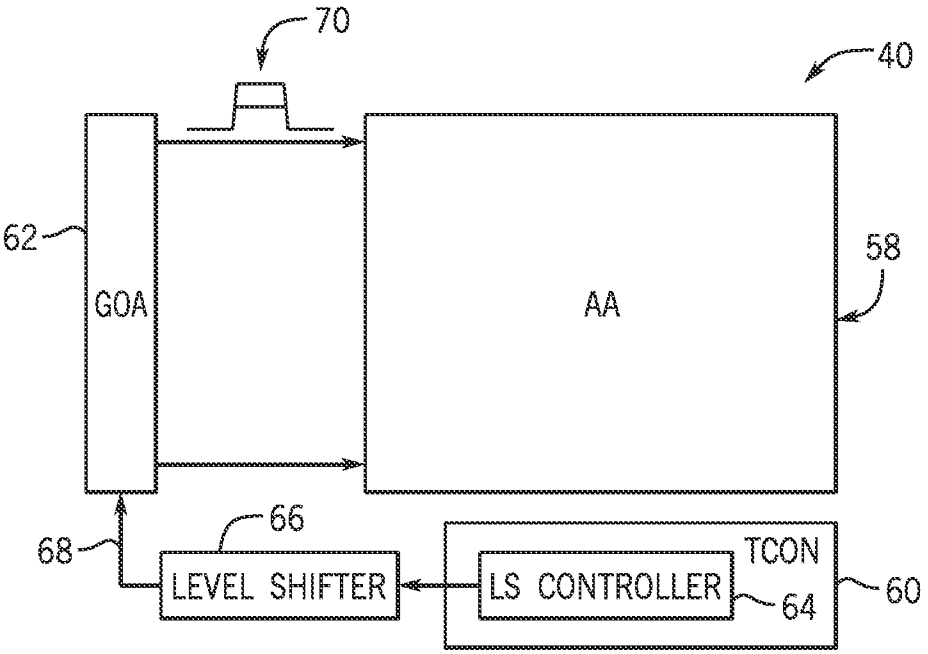
FIG. 8 is a block diagram of a portion of a display panel including an active area of display pixels, a timing controller (TCON), and a GOA, in accordance with an embodiment.

As discussed above, display image data 56 may be sent to the display panel 40 to illuminate one or more display pixels based thereon. To help illustrate, FIG. 8 is a block diagram of a portion of the display panel 40 including an active area of display pixels 58, a timing controller (TCON) 60, and a gate-on-array (GOA) 62. As discussed above, the display pixels 58 may be any suitable type of pixel including self-emissive pixels (e.g., LED, micro LED, OLED, etc.) or transmissive pixels (e.g., LCD). Moreover, the TCON 60 may control emission timings and/or refreshes of the electronic display 12 and generally govern operation of the display panel 40. For example, the TCON 60 may include a level shifter controller 64 to control a level shifter 66 that provides an activation signal 68 to the GOA 62. As should be appreciated, while shown as separate from the TCON 60, the level shifter 66 may be implemented as part of the TCON 60 and/or integrated with the level shifter controller 64.

In general, the GOA 62 is an array of thin-film-transistors (TFTs) such as oxide TFTs that buffer the activation signal 68 for rows of display pixels 58 in the active area. The gate signals 70 (e.g., buffered activation signals) may be provided (e.g., row-by-row) along with time aligned data signals, indicative of the display image data 56, such that a combination (e.g., convolution, summation, multiplication or other combination) of a gate signal 70 and data signal are provided to a display pixel 58. In other words, the gate signals 70 may be used to modulate the application of data signals to the display pixels 58 such that the display pixels 58 illuminate at the desired color and/or luminance. In some embodiments, the display pixels 58 are provided gate signals 70 by row such that the activation signal 68 is buffered for a first row, followed by a second row, and so on until the last row of the active area. As should be appreciated, additional circuitry, such as a gamma bus generator, may provide the data signals and/or combine the gate signal 70 with the data signals.

Figure 9:
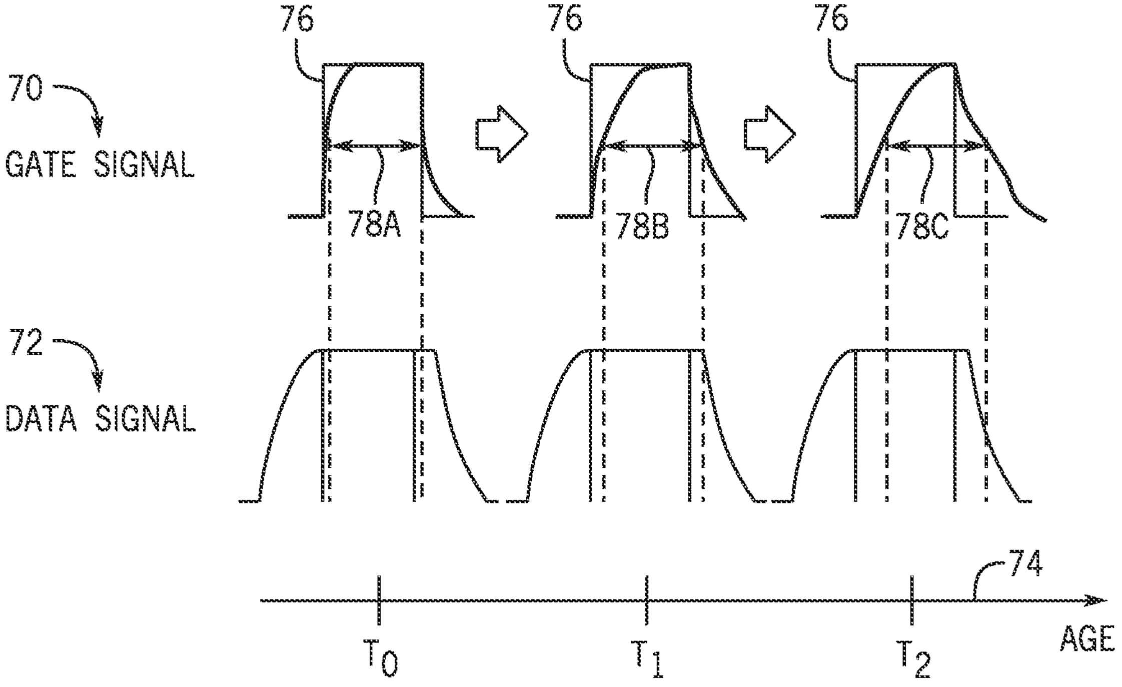
FIG. 9 is a set of graphs of a gate signal and a data signal at multiple ages of the GOA relative to a square waveform, in accordance with an embodiment.

However, as the TFTs (e.g., oxide TFTs) of the GOA 62 age (e.g., due to utilization, due to environmental factors such as temperature and humidity, age over time, etc.), the characteristics of the gate signals 70 may change. For example, the rising and falling edges of the gate signal 70 may have altered (e.g., slower) responses as the age of the GOA 62 increases. The altered responses of the GOA 62 may result in changes in the dataline voltage/current applied to the display pixels 58 and, therefore, may lead to image artifacts such as errors in color or luminance output. To help illustrate, FIG. 9 is a set of graphs of the gate signal 70 and data signal 72 at multiple ages 74 (e.g., T0, T1, and T2) of the GOA 62 relative to a square waveform 76. At each age 74, the gate signal 70 attempts to approximate the square waveform 76 and has an on period 78A, 78B, 78C (generally 78) that coincides with the data signal 72. However, as the age 74 of the GOA 62 increases, the on period 78 may shift and/or change in length. For example, the on period 78C at age T2 may be delayed relative to and/or shorter than the on period 78B at age T1, which may be delayed relative to and/or shorter than the on period 78A at age T0. As depicted, as the GOA 62 ages, the on period 78 of the gate signal 70 may become more delayed and/or shorter. Moreover, at some age 74 (e.g., age T1) the relative timing of the on period 78 of the gate signal 70 may get out of sync with the data signal 72, and the asynchronicity may worsen as the age 74 increases. Due to the on period 78 of the gate signal 70 being out of phase/sync with the data signal 72, the applied voltage/current to the display pixels 58 may be different than desired, leading to image artifacts. As should be appreciated, the gate signal 70 and data signal 72 of FIG. 9 are given as example signals and for example relative timings and, as such, are non-limiting.

To reduce or eliminate errors associated with aging of the GOA 62, the age 74 may be estimated and compensation may be introduced in either the analog domain (e.g., by compensating the phase or voltage level of the activation signal 68) or the digital domain (e.g., by compensating the display image data 56, such as via the GOA compensation block 52). As discussed above, the effects of GOA aging are demonstrated in the characteristics of the gate signals 70 and the voltage/current of the display pixels 58. As such, to measure the effects of GOA aging, circuitry may be implemented to analyze the gate signals 70 and/or the pixel currents.

Figure 10:
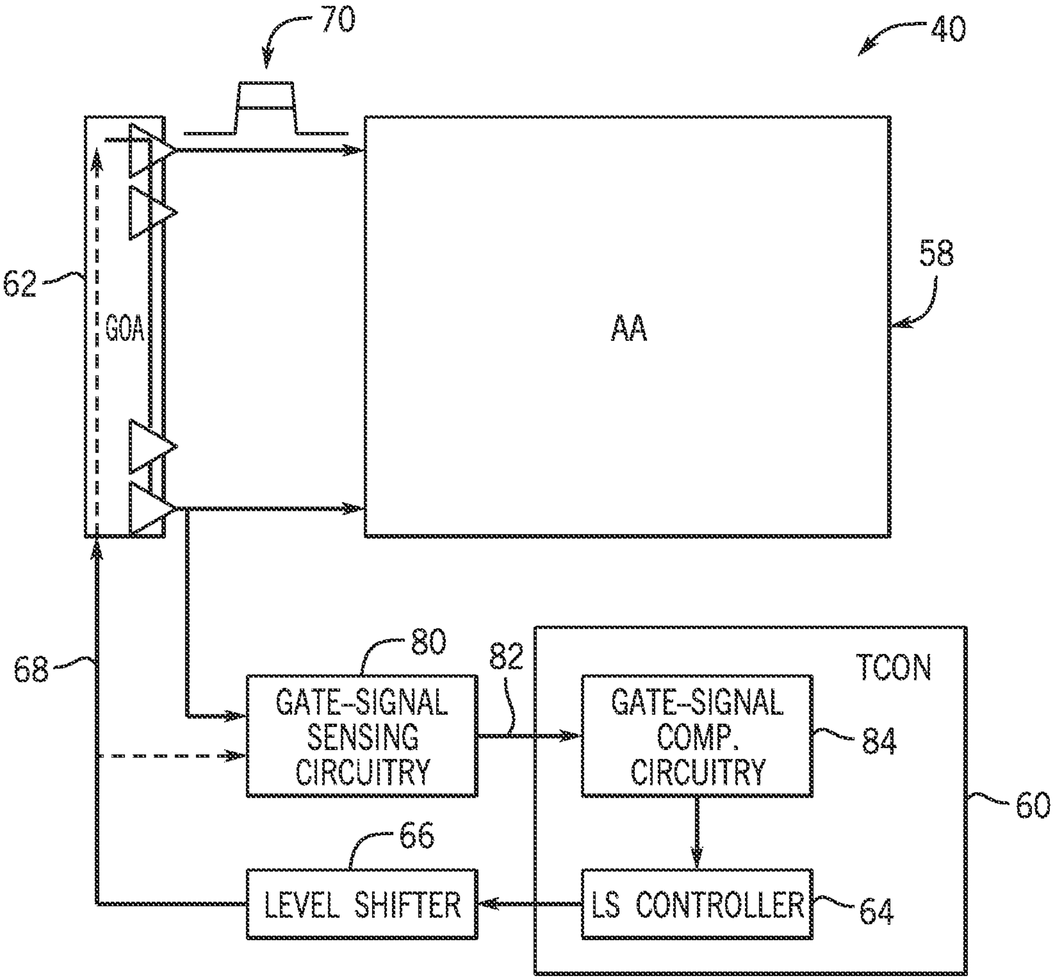
FIG. 10 is the portion of the display panel of FIG. 8 including gate-signal sensing circuitry and gate-signal compensation circuitry, in accordance with an embodiment.

In some embodiments, gate-signal sensing circuitry 80 is used to measure the voltage response of one or more gate signals 70 output from the GOA 62 in response to the activation signal 68, as shown in FIG. 10. For example, the gate-signal sensing circuitry 80 may receive the gate signal 70 output from a row of the GOA 62 and compare the rising and falling voltage characteristics and/or on period 78 to that of a baseline (e.g., set during manufacturing, taken during an initialization phase of the life of the GOA 62, etc.). As should be appreciated, any row of gate signals 70 may be utilized by the gate-signal sensing circuitry 80 for comparison to the baseline. However, in some embodiments, the last row of the GOA 62 may exhibit the largest deviations due to the previous utilizations of the activation signal 68 by the previous rows of the GOA 62. As such, it may be desirable to obtain gate signal measurements from one of the later rows (e.g., the last row) of the GOA 62 to better sense the effects of GOA aging.

Additionally, in some embodiments, the gate-signal sensing circuitry 80 may utilize the activation signal 68 as a comparison upon which to obtain a relative difference in the current (e.g., measured) gate signal 70 and that of the baseline. For example, the gate-signal sensing circuitry 80 may measure the timing difference between the rising edge (or falling edge or both) of the activation signal 68 and the rising edge (or falling edge or both) of the gate signal 70. As shown in FIG. 9, the rising edge may become more and more delayed as the GOA 62 ages. As such, as the GOA 62 ages, the timing difference between the rising edge of the activation signal 68 and the rising edge of the gate signal 70 may increase. Furthermore, the increase in the timing difference between that of the current (e.g., measured) gate signal 70 and the baseline may be indicative of the phase shift (e.g., delay) of the gate signal 70 due to GOA aging. Moreover, the on period 78 may be directly measured, or the rising and falling edges may be measured and the on period 78 calculated as the difference therebetween. As should be appreciated, the rising and falling edges may be measured according to a threshold activation amount, above which the gate signal 70 is considered "on" and below which the gate signal 70 is considered "off." As such, by sensing the voltage response of the gate signal 70 output from the GOA 62 by itself or relative to the activation signal 68 the effect of GOA aging may be measured.

After measuring the characteristics of the gate signal 70, the gate-signal sensing circuitry 80 may output an estimated aging parameter 82. As should be appreciated, the estimated aging parameter 82 may be any suitable signal indicative of the extent of aging that has occurred to the GOA 62 and may be of any suitable form (e.g., analog or digital). For example, the estimated aging parameter 82 may be representative of the rising edge delay, the falling edge delay, the on period 78 length, a time delay of the on period 78, a quantized age, etc. As discussed above, the gate-signal compensation may be performed digitally via an image processing block 50 (e.g., the GOA compensation block 52) or in the analog domain such as within the TCON 60. When performed in the digital domain, such as via the GOA compensation block 52 of the image processing circuitry 28, the estimated aging parameter 82 may be communicated to the GOA compensation block 52, and the image data compensated according to the estimated optical error associated with the GOA aging.

When performed in the analog domain, gate-signal compensation circuitry 84 may receive the estimated aging parameter 82 and adjust the activation signal 68 accordingly (e.g., via the level shifter controller 64 and level shifter 66). As should be appreciated, although the gate-signal sensing circuitry 80 is depicted outside the TCON 60 and the gate-signal compensation circuitry 84 is depicted inside the TCON 60, either circuitry may be implemented within or independent of the TCON 60. Moreover, the TCON 60 may utilize any suitable circuitry to modify the activation signal 68 to compensate the gate signal 70.

In compensating the gate signal 70, the gate-signal compensation circuitry 84 alters the voltages of the activation signal 68 and/or the timing of the activation signal 68 and/or the data signal 72. For example, the level shifter 66 output may vary between a reference voltage (e.g., in the inactive state) and an activation voltage of the activation signal 68. In some embodiments, the gate-signal compensation circuitry 84 may direct (e.g., via the level shifter controller 64) the level shifter 66 to increase the activation voltage of the activation signal 68 and/or decrease the reference voltage. By adjusting the voltage levels of the activation signal 68, the response (e.g., rising and falling edges) of the gate signal 70 may be enhanced such that the length of the on period 78 and/or synchronicity of the on period 78 (e.g., relative to the data signal 72) is adjusted to or towards that of the baseline.

Additionally or alternatively to adjusting the voltage levels of the activation signal 68, the timing of the activation signal 68 and/or the data signal 72 may be adjusted. Indeed, the TCON 60 may speed up (e.g., via the level shifter controller 64) the timing (e.g., phase) of the activation signal 68 relative to the data signal 72 and/or delay the timing (e.g., phase) of the data signal 72 such that the on period 78 of the gate signal 70 is aligned (e.g., in phase) with the data signal 72 application transmitted to the display pixels 58. As such, the gate signal 70 may be compensated for the aging of the GOA 62.

Figure 11:
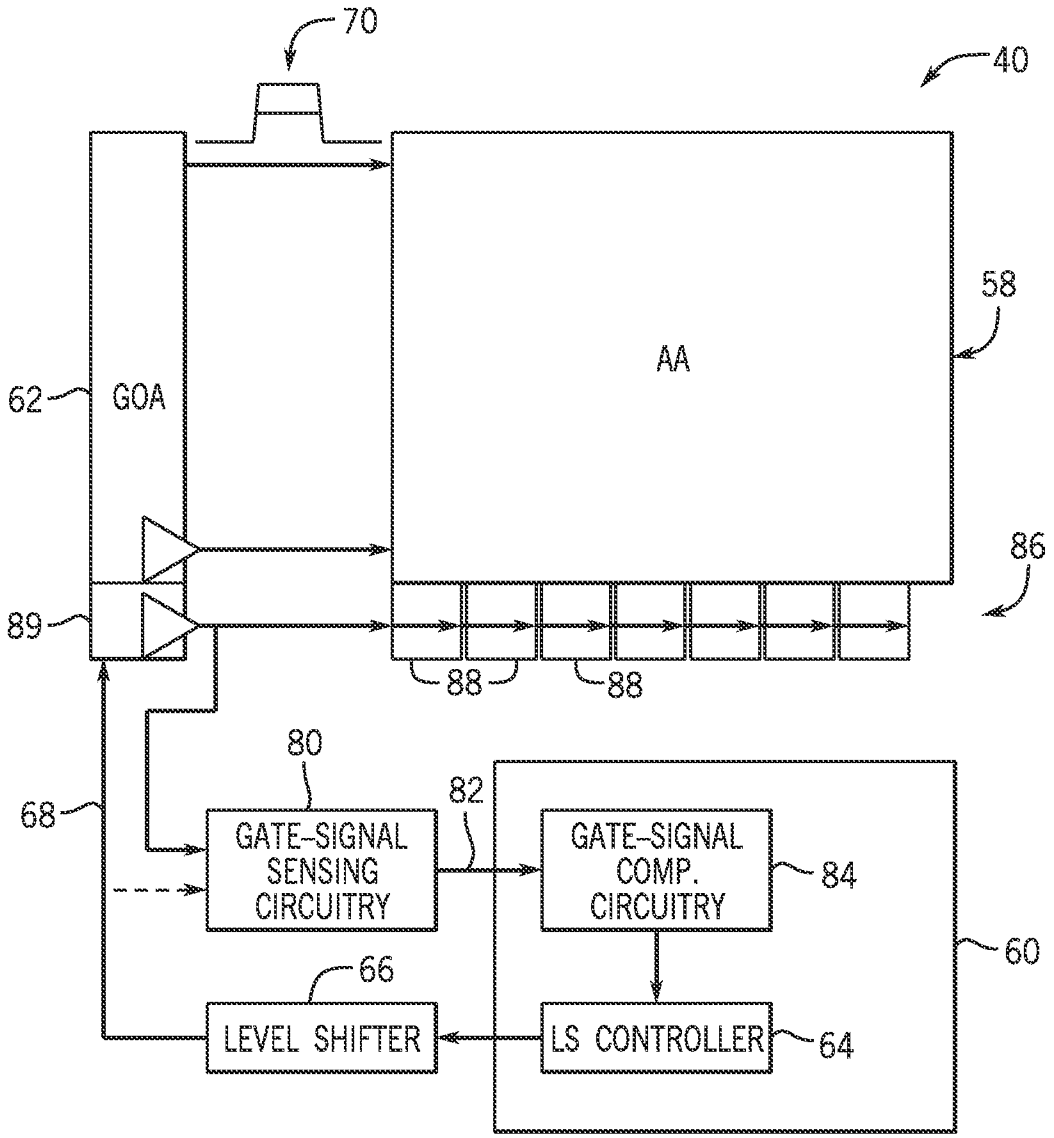
FIG. 11 is the portion of the display panel of FIG. 10 including dummy pixels, in accordance with an embodiment.
Figure 12:
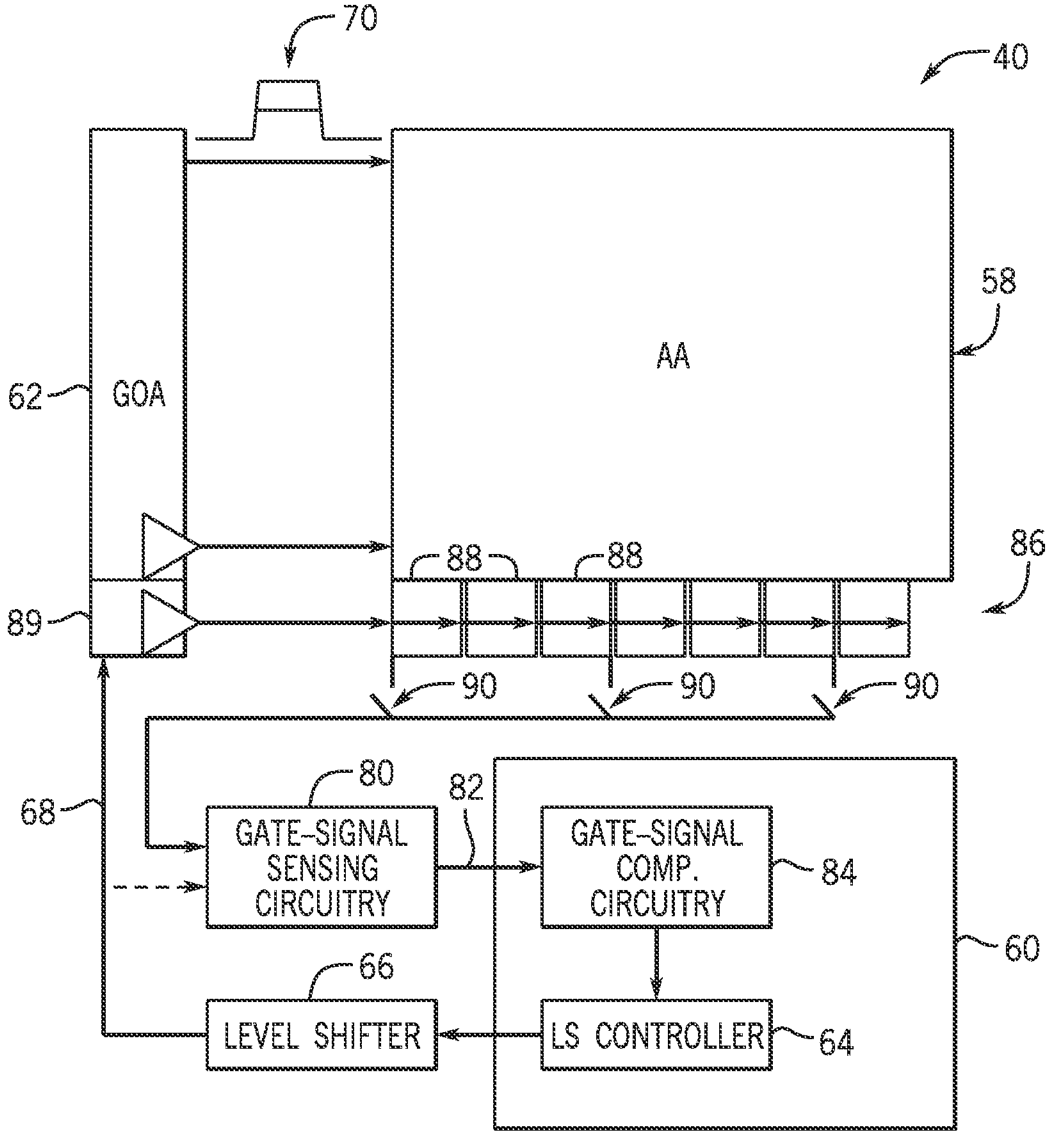
FIG. 12 is the portion of the display panel of FIG. 10 including dummy pixels and selector switches, in accordance with an embodiment.

As discussed above, the measurement of the gate signal 70 may be performed on any suitable row of the GOA outputs. However, in some scenarios, the different pixel utilizations of different image frames may cause fluctuations in the gate signals 70 that could affect the measurement of the estimated aging. As such, in some embodiments, a dummy row 86 of dummy pixels 88 may be implemented and supplied by a dummy GOA row 89, as shown in FIG. 11, such that consistent measurements may be taken (e.g., via the gate-signal sensing circuitry 80). For example, the voltage measurements of the gate-signal sensing circuitry 80 may be performed while a known set of data signals 72 are applied to the dummy pixels 88. Furthermore, instead of measuring the gate signal 70 at a single position (e.g., at the output of the GOA 62), the gate signal 70 may be measured at one or more different positions along the dummy row 86 (e.g., by closing one of a number of switches 90), as shown in FIG. 12. By varying the location at which the gate signal 70 is measured, the gate-signal compensation circuitry 84 may compensate for the worst-case scenario (e.g., such that the location with the highest gate signal error is compensated) or may compensate based on an average of the gate signals 70 measured at different locations along the dummy row 86. As should be appreciated, the dummy GOA row 89 may be identical to other rows of the GOA 62, and the dummy row 86 of dummy pixels 88 may be identical to the other display pixels 58. Moreover, the dummy pixels 88 may be located within or outside of the active area, but are not utilized to display the display image data 56.

Figure 13:
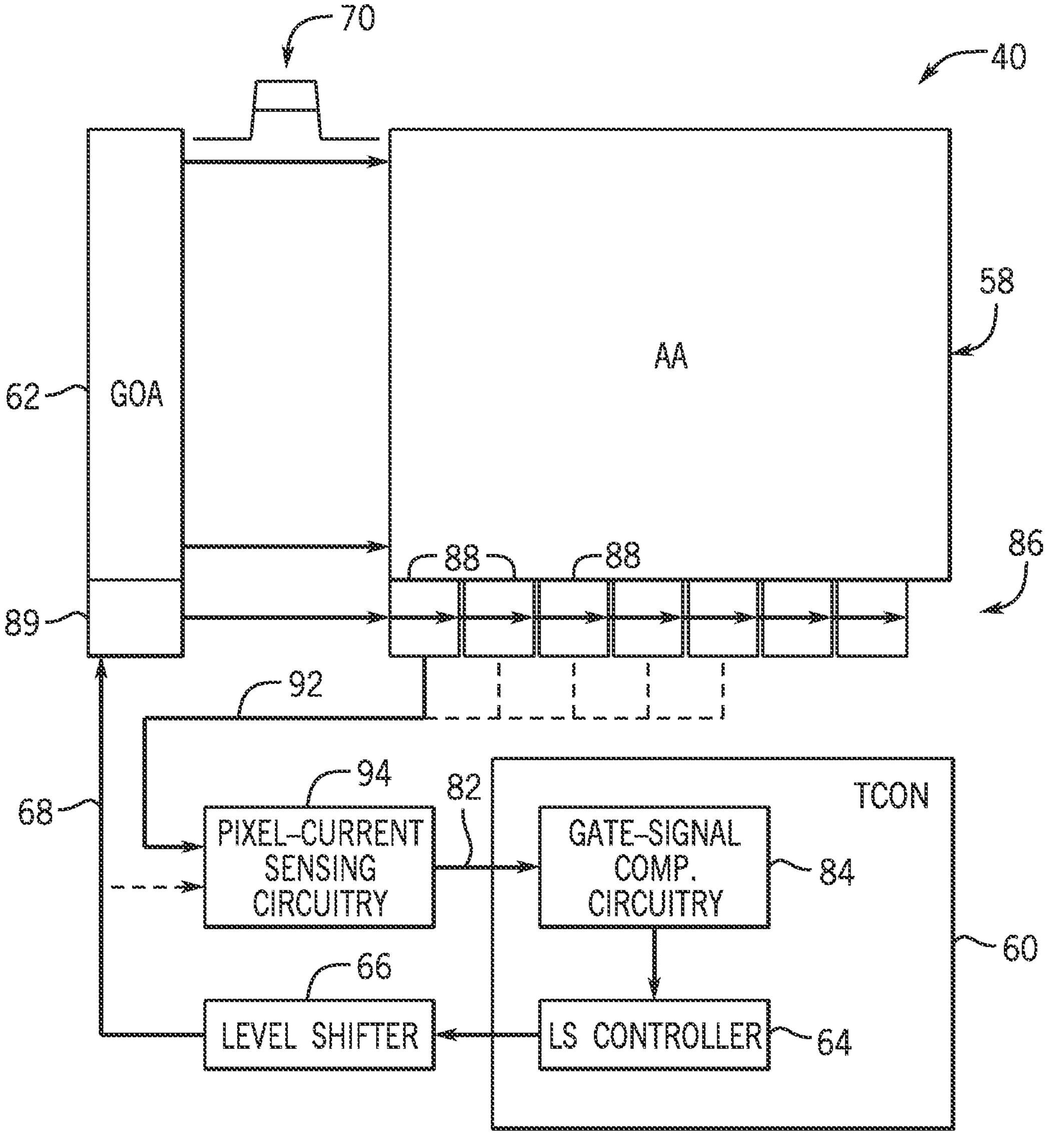
FIG. 13 is the portion of the display panel of FIG. 8 including pixel-current sensing circuitry, gate-signal compensation circuitry, and dummy pixels in a row, in accordance with an embodiment.

Additionally or alternatively to measuring the response of the gate signal 70 (e.g., via the gate-signal sensing circuitry 80), the current response 92 of the display pixels 58 may be measured (e.g., by pixel-current sensing circuitry 94), as in FIG. 13. As discussed above, GOA aging may affect the current response of the display pixels 58 (e.g., by shortening or delaying the on period 78). As such, instead of or in addition to measuring the gate signal 70 output from the GOA 62 directly, pixel-current sensing circuitry 94 may measure the current response 92 of one or more display pixels 58 (e.g., dummy pixels 88) may be measured and compared to a baseline (e.g., set during manufacturing, measured during an initialization phase, etc.). For example, in response to a known data signal 72, a pixel or group of pixels may be expected to have a particular current response 92, according to the baseline. However, as the GOA 62 ages, the current response 92 may change (e.g., decrease) in accordance with the delayed and/or shortened on period 78. As such, the difference between the measured current response 92 and the baseline may be indicative of GOA aging. As should be appreciated, the pixel-current sensing circuitry 94 may measure the current response 92 of a single dummy pixel 88, a conglomerate (e.g., summation of currents) of a group of dummy pixels 88, or a conglomerate of the dummy row 86.

Figure 14:
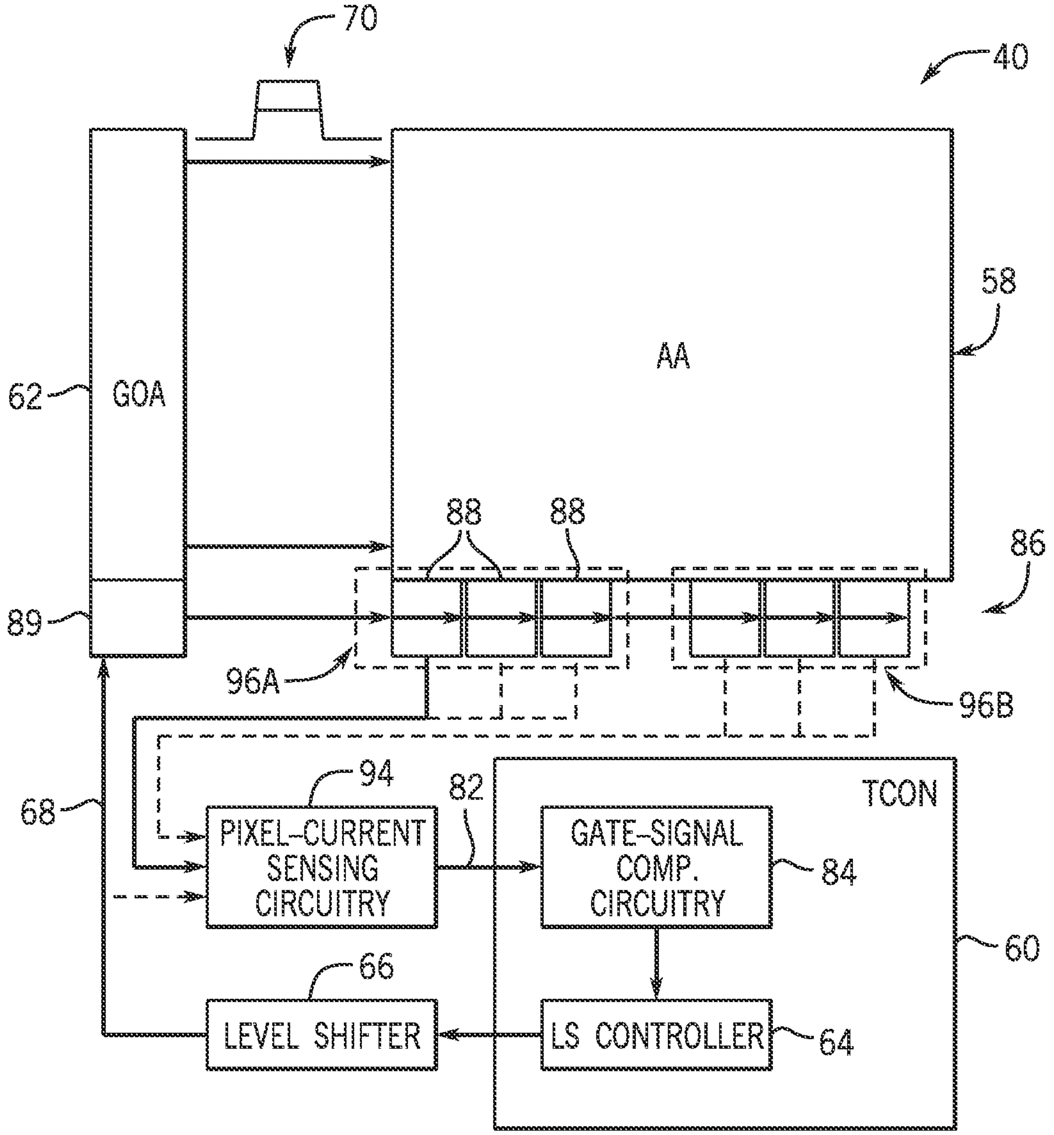
FIG. 14 is the portion of the display panel of FIG. 13 with grouped dummy pixels in a dummy row, in accordance with an embodiment.

Moreover, in some embodiments, the dummy row 86 may be segregated into different groups 96A, 96B (cumulatively 96), as shown in FIG. 14. Different groups 96 may undergo different stress conditions (e.g., different data signals 72) such that the dummy pixels 88 are aged by different amounts. By having different groups 96 of dummy pixels 88, the aging effect of the dummy pixels 88 may be separated, at least in part, from the aging effect of the GOA 62. As should be appreciated, the pixel-current sensing circuitry 94 may measure the current response for multiple different groups 96 during the same image frame or across multiple different image frames.

Figure 15:
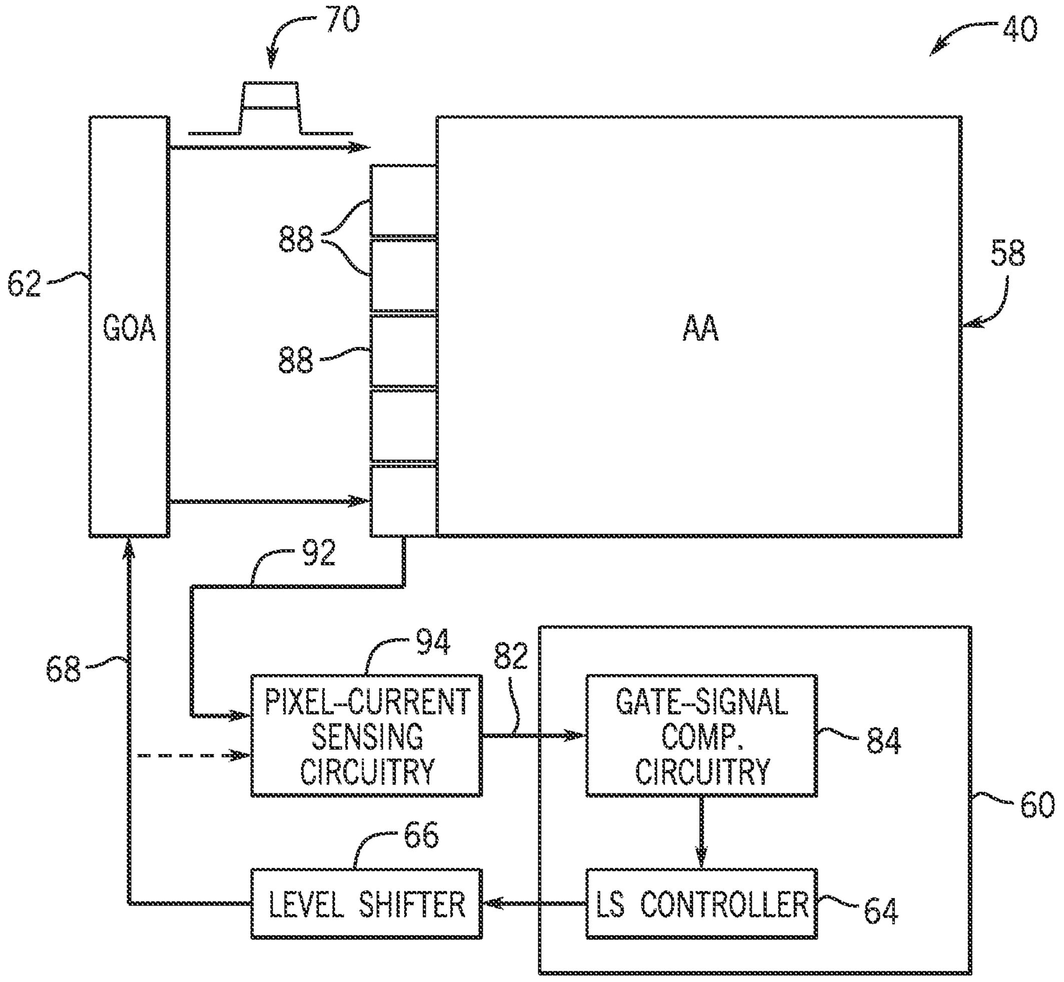
FIG. 15 is the portion of the display panel of FIG. 8 including pixel-current sensing circuitry, gate-signal compensation circuitry, and dummy pixels in multiple rows, in accordance with an embodiment.

Furthermore, while discussed above and in FIGS. 13 and 14 as having a dummy row 86 of dummy pixels 88, in some embodiments, dummy pixels 88 may be implemented on different rows, as in FIG. 15. By implementing the dummy pixels 88 across multiple different rows, the gate signals 70 of multiple different rows may be considered, which may yield additional information about the aging of the components of the GOA 62. In some embodiments, the current response 92 may be taken from each row individually or the current response 92 may be an average or summation of the dummy pixels 88 of multiple (e.g., all) rows. As should be appreciated, dummy pixels 88 may be implemented in either a dummy row 86, across multiple rows, or both depending on implementation. For example, space constraints may favor an additional horizontal dummy row 86 as opposed to a vertical column of dummy pixels 88, or vice versa.

Upon measuring the current response 92, the pixel-current sensing circuitry 94 may output an estimated aging parameter 82, which may be the same as or different from that of the gate-signal sensing circuitry 80. For example, the estimated aging parameter 82 output from the pixel-current sensing circuitry 94 may be indicative of a current response 92. As discussed above, the estimated aging parameter 82 may be provided to the GOA compensation block 52 and/or the gate-signal compensation circuitry 84. Moreover, in some embodiments, estimated aging parameters 82 from both the pixel-current sensing circuitry 94 and the gate-signal sensing circuitry 80 may be utilized to compensate the gate signal 70.

Figure 16:
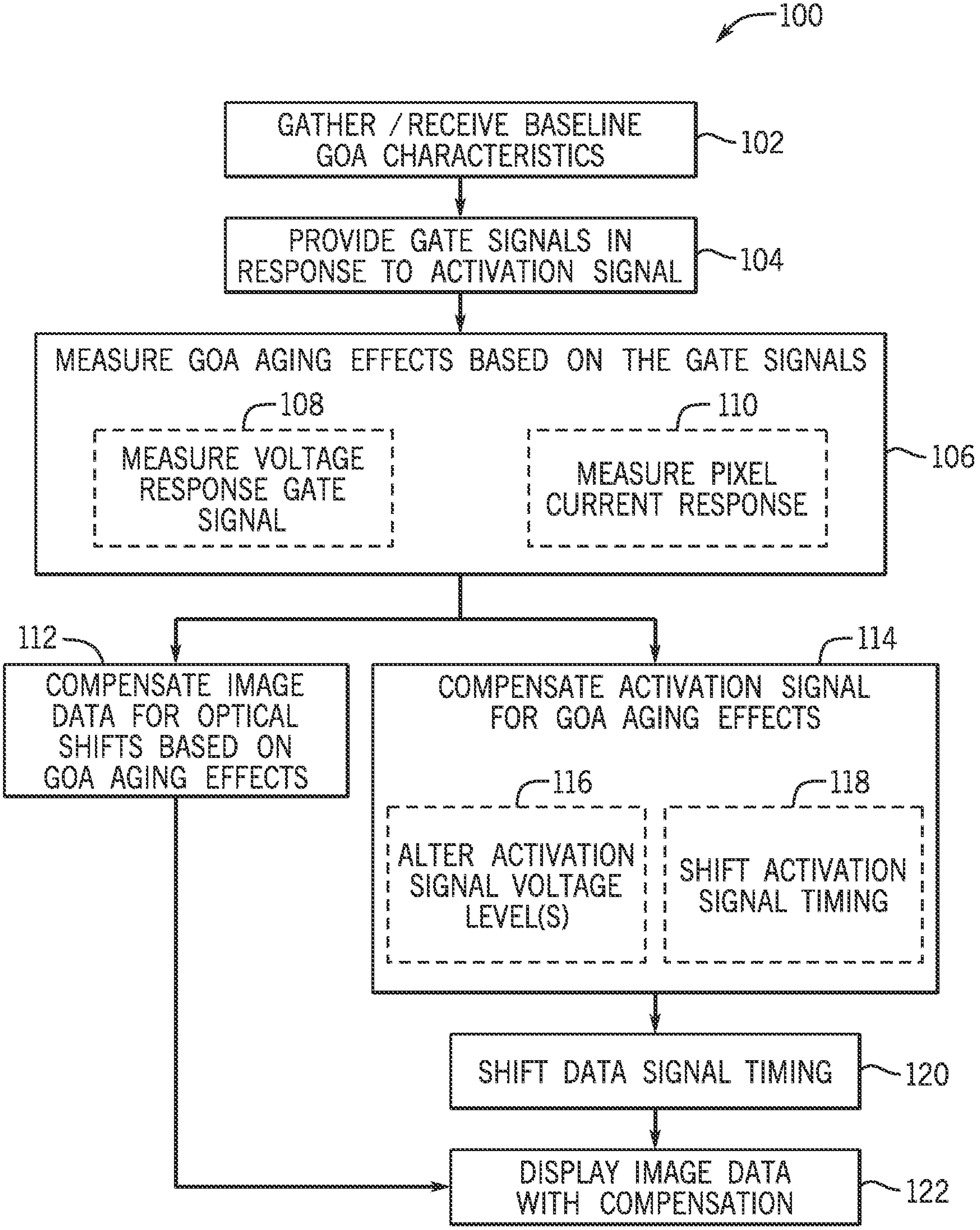
FIG. 16 is a flowchart of an example process for compensating for GOA aging, in accordance with an embodiment.

FIG. 16 is a flowchart 100 of an example process for compensating the gate signal 70 of a GOA 62 for aging. In some embodiments, baseline GOA characteristics may be received or gathered (process block 102). For example, the baseline GOA characteristics (e.g., baseline gate signal voltages and timings, baseline pixel current responses, etc.) may be received or measured during or after manufacturing. During operation of the electronic display 12, gate signals 70 may be provided by the GOA 62 in response to activation signals 68 (process block 104). Based on the gate signals 70 generated by the GOA 62, the GOA aging effects may be measured (process block 106). For example, the GOA aging effects may be measured by measuring the voltage response of the gate signal 70 (process block 108) and/or measuring the pixel current response 92 (process block 110). As should be appreciated, measurement of the gate signal 70 (e.g., via the gate-signal sensing circuitry 80) and/or measurement of the pixel current response 92 (e.g., via the pixel-current sensing circuitry 94), as well as compensation implementation, may be performed continuously (e.g., each image frame, every other image frame, every tenth image frame, and so on), periodically (e.g., once per day, once per week, once per month, and so on), and/or in response to other stimuli (e.g., a reboot of the electronic device 10, an error indication, etc.).

Based on the measured aging effects, the image data may be compensated to counter for optical shifts (e.g., color and/or luminance errors) that would otherwise appear due to the GOA aging effects (process block 112). Additionally or alternatively, the activation signal 68 may be compensated for the GOA aging effects (process block 114). The activation signal compensation may include alteration of the activation signal 68 voltage level(s) (process block 116) and/or shifting of the activation signal 68 timing (process block 118). Additionally or alternatively to the activation signal compensation, the timing of the data signal 72 may be shifted (process block 120). As should be appreciated, the activation signal compensation and the data signal timing shift may be utilized individually or in conjunction with one another to achieve synchronization between the gate signal 70 and the data signal 72. After image data compensation, activation signal compensation, and/or data signal compensation, the display image data 56 may be displayed (process block 122).

The specific embodiments described above have been shown by way of example, and it should be understood that these embodiments may be susceptible to various modifications and alternative forms. Moreover, although the above referenced flowchart 100 is shown in a given order, in certain embodiments, process/decision blocks may be reordered, altered, deleted, and/or occur simultaneously. Additionally, the referenced flowchart 100 is given as an illustrative tool and further decision and process blocks may also be added depending on implementation. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

image processing circuitry configured to generate image data;

an electronic display configured to display the image data, wherein the electronic display comprises:

a gate-on-array (GOA) configured to generate a plurality of gate signals in response to an activation signal;

a plurality of pixels configured to be programmed in response to a combination of the plurality of gate signals and a plurality of data signals, wherein at least a portion of the plurality of data signals correspond to the image data; and sensing circuitry configured to:

measure a first characteristic response of a gate signal of the plurality of gate signals, measure a second characteristic response of one or more pixels of the plurality of pixels, or measure the first characteristic response and the second characteristic response; and compare the first characteristic response to a first baseline of the gate signal, compare the second characteristic response to a second baseline of the one or more pixels, or compare the first characteristic response to the first baseline and compare the second characteristic response to the second baseline; and compensation circuitry configured to:

apply a first compensation to the activation signal based on the comparison between the first characteristic response and the first baseline, the comparison between the second characteristic response and the second baseline, or both, wherein the first compensation comprises a first change to an activation voltage of the activation signal, a second change to a timing of the activation signal, or both;

apply a second compensation to the image data based on the comparison between the first characteristic response and the first baseline; or apply the first compensation to the activation signal and the second compensation to the image data.

2. The electronic device of claim 1, wherein the GOA comprises an array of oxide thin-film transistors (TFTs).

3. The electronic device of claim 2, wherein the plurality of pixels comprises a plurality of organic light emitting diodes (OLEDs).

4. The electronic device of claim 1, wherein the sensing circuitry is configured to measure the first characteristic response of the gate signal and compare the first characteristic response to the first baseline of the gate signal, wherein the first characteristic response of the gate signal comprises a voltage response of the gate signal.

5. The electronic device of claim 4, wherein the GOA comprises a dummy GOA configured to generate the gate signal and transmit the gate signal to a dummy row of the plurality of pixels.

6. The electronic device of claim 4, wherein the sensing circuitry is configured to measure the gate signal at one or more locations of a plurality of locations between pixels of the plurality of pixels, wherein the sensing circuitry is configured to select the one or more locations from the plurality of locations via one or more switches.

7. The electronic device of claim 4, wherein the compensation circuitry is configured to apply the first compensation to the activation signal based on the comparison between the first characteristic response and the first baseline, wherein the first compensation comprises an increase to the activation voltage of the activation signal, an advancement in the timing of the activation signal, or both.

8. The electronic device of claim 4, wherein the compensation circuitry is disposed in the image processing circuitry and is configured to apply the second compensation to the image data based on the comparison between the first characteristic response and the first baseline, wherein applying the second compensation comprises altering luminance levels of the image data.

9. The electronic device of claim 4, wherein measuring the voltage response comprises measuring an on period of the gate signal.

10. The electronic device of claim 1, wherein the sensing circuitry is configured to measure the second characteristic response of the one or more pixels and compare the second characteristic response to the second baseline of the one or more pixels, wherein the second characteristic response of the one or more pixels comprises a current response of the one or more pixels.

11. The electronic device of claim 10, wherein the one or more pixels comprise dummy pixels of the plurality of pixels.

12. The electronic device of claim 11, wherein the dummy pixels are located in a dummy column of the plurality of pixels.

13. The electronic device of claim 10, wherein the compensation circuitry is configured to apply the first compensation to the activation signal based on the comparison between the second characteristic response and the second baseline, wherein the first compensation comprises an increase in the activation voltage of the activation signal, an advancement in the timing of the activation signal, or both.

14. The electronic device of claim 1, wherein the first baseline is set during manufacturing of the electronic display, the second baseline is set during the manufacturing, or the first baseline and the second baseline are set during the manufacturing.

15. A method comprising:

measuring, in response to an activation signal supplied to a gate-on-array (GOA), a voltage response of a gate signal of the GOA;

determining a difference between the voltage response of the gate signal and a baseline voltage response;

determining an estimated aging parameter associated with an age of the GOA based on the difference between the voltage response and the baseline voltage response; and compensating the activation signal based on the estimated aging parameter, wherein compensating the activation signal comprises altering a voltage level of the activation signal, shifting a timing of the activation signal, or both.

16. The method of claim 15, wherein compensating the activation signal comprises shifting the timing of the activation signal relative to a data signal, wherein the data signal is indicative of image data.

17. The method of claim 15, wherein the gate signal is output from a last row of the GOA, and wherein the last row of the GOA corresponds to a dummy row of the GOA configured to supply the gate signal to a row of dummy pixels.

18. The method of claim 15, wherein the baseline voltage response comprises a previous measurement of the voltage response.

19. A method comprising:

measuring, in response to one or more gate signals supplied to one or more dummy pixels of a display panel by a gate-on-array (GOA), a current response of the one or more dummy pixels, wherein the GOA is configured to generate the one or more gate signals in response to an activation signal;

determining a difference between the current response of the one or more dummy pixels and a baseline current response;

determining an estimated aging parameter associated with an age of the GOA based on the difference between the current response and the baseline current response; and compensating, via compensation circuitry, the activation signal based on the estimated aging parameter.

20. The method of claim 19, wherein the one or more dummy pixels comprise a plurality of dummy pixels disposed in a dummy row, wherein the dummy row is disposed adjacent a display pixel row within an active area of the display panel, and wherein the dummy row is supplied the one or more gate signals by a dummy GOA.

21. The method of claim 19, wherein the one or more dummy pixels comprise two or more dummy pixels, and wherein the current response comprises a summation of currents of each of the two or more dummy pixels.

22. The method of claim 19, wherein the activation signal is generated by a level shifter, and wherein the compensation circuitry is configured to compensate the activation signal by adjusting a voltage level output of the level shifter.

* * * * *